Dec. 6, 1949 C. R. BUSCH 2,490,204
COMBINED BRAKE BEAM AND BRAKE HEAD
Filed March 6, 1946
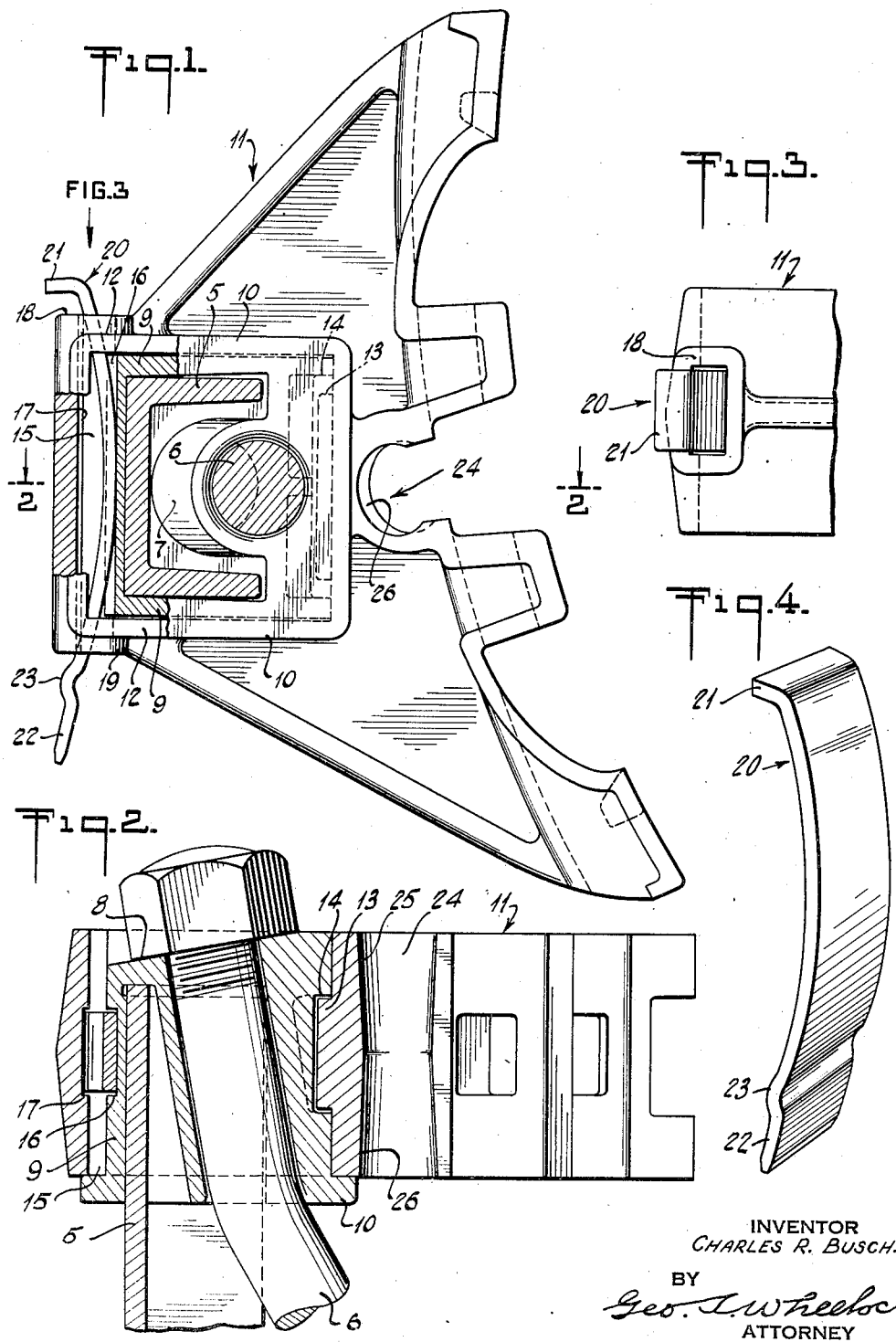
INVENTOR
CHARLES R. BUSCH.
BY
Geo. T. Wheelock
ATTORNEY Patented Dec. 6, 1949

2,490,204

UNITED STATES PATENT OFFICE 2,490,204

COMBINED BRAKE BEAM AND BRAKE HEAD

Charles R. Busch, Orange, N. J., assignor to Buffalo Brake Beam Company, New York, N. Y., a corporation of New York Application March 6, 1946, Serial No. 652,337

5 Claims. (Cl. 188—224.1)

The present invention relates preferably and more particularly to certain improvements in the invention disclosed in my application filed August 5, 1943, Serial Number 497,418, now matured into Patent No. 2,398,918, dated August 23, 1946, although it is capable of wider application to brake beams of the hanger supported type generally whether they be of adjustable truss or other type.

Where the hanger type of brake beams is used it has been observed that the brake heads should last longer if they were not subjected to certain shocks due to forces in an upward direction which are created by irregular track, low joints of rails and the like, and also due to forces acting horizontally and which are created by the flanges of the car wheels shifting laterally hard against the opposite rails of the track. Such forces are also attributable to worn wheels and their flanges and to journals and their bearings.

Therefore, an object of the present invention is to so mount the brake heads on a brake beam that, while they are sufficiently rigid thereon for enabling the brake shoes on th heads to exert their powerful braking pressures on the car wheels, they are not so rigidly supported on the brake beam but that they yield to such a reasonable amount as to practically nullify any weakening effect of the aforesaid shocks upon the heads; for if some such provision is not made the brake beam hangers so control the beam that it can have no lengthwise movements, and when the brake heads are too rigidly supported on such beam they suffer more or less deterioration because of the effect of such shocks.

To carry such object into effect and to gain its advantages the brake heads are so mounted on the brake beam that they can more or less breathe as it were inwardly and outwardly to offset the lack of movement of the beam endwise of its longitudinal axis, or respond to aforesaid forces other than the braking pressures, and this is permitted by providing spring means acting between and on the backs of the heads and certain parts on the beam to absorb the shocks referred to.

These and other objects being aimed at by the present invention, the preferred construction will now be described with reference to the accompanying drawings in which Fig. 1 is a transverse sectional view of an adjustable truss brake beam with a brake head thereon, parts in elevation and broken away;

Fig. 2 is a section thereof on line 2—2;

Fig. 3 is a broken detail top view of the brake head; and

Fig. 4 is a perspective view of the shock absorber.

Figs. 1 and 2 illustrate one end and brake head of an adjustable truss brake beam substantially corresponding with similar and associated parts of the invention disclosed in the aforesaid application Serial No. 497,418, and Patent 2,398,918 and the other end of the beam and its brake head are similar to such illustration.

In said drawings a channeled compression member 5 and a tension member 6 are shown, the threaded end of the latter extending through a sleeve or thimble 7 and projecting beyond a seat 8 to receive the usual adjusting nut. The nut seat 8 is on a recessed member 9 which surrounds thimble 7, and into the recess of said member the end of the compression member is entered to abut against the back surface of the seat.

Supporting members such as a member 9 uniting the two members of the truss firmly together when the adjusting nut is fully tightened up constitute what may be termed "truss locks."

Lock or support member 9 is preferably of generally rectangular shape and is provided with a surrounding back flange or rib 10 which forms a lateral abutment for the brake head 11. The brake head is provided with a substantially rectangular back collar 12, the opening through which extends transversely of the head and is somewhat greater in dimension rearwardly of the face portion of the head than the rearward dimension of the lock member 9. This permits the brake head to be mounted on the beam because the collar 12 will clear and pass the tensioning nut in doing so.

Projecting rearwardly from the back of the face portion of the brake head there is a boss 13 which is entered into a recess 14 in the front of the lock member 9 so that the latter and the head may be interlocked together, and when that is done a space or throat 15 is left between the mutually facing surfaces of the back wall of the collar 12 and the back of the lock.

The surfaces defining the front and back of the space 15 are provided with opposite parallel grooves 16, 17, respectively, which extend vertically between the brake head and the lock member, the ends of the groove 17 terminating in top and bottom eyes 18, 19 of collar 12. The openings of the eyes communicate with the space 15 and they and said grooves provide a throat to permit the insertion of suitable means adapted to keep the brake head interlocked with the front of lock member 9.

Such insertible means preferably resides in an element such as a strip of tempered steel in the form of a pre-bowed spring key 20 shown in detail in Fig. 4. The upper end of the key is deflected to form a lip 21 to provide a hand-hold, while near its lower end the key is provided with a shoulder 23, and the key is bowed from end to end in a direction opposite to that in which the lip 21 and the shoulder 23 project from the key.

With such key 20 it is possible to secure the brake head on the brake beam after its collar has been slipped over the lock member 9. To do so the leading end 22 of the key is first inserted through the upper eye 18 of the collar and then the key is pushed downwardly along the groove 16 of the lock member, with the forwardly bowed surface engaging in the groove 16, as shown in Fig. 1.

When the key is fully pressed down so that the leader end 22 and the shoulder 23 have emerged from the lower eye 19 of the collar 12, said shoulder will have snapped rearwardly and interlocked the key with the brake head. At the same time the upper end of the key will be in rearward snap engagement with the upper eye 18.

With the spring key locking the brake head onto the beam, when there is any tendency to straighten out the key and to move the head ever so slightly forward away from the lock member the pressure of the key in one direction at its ends and in the opposite direction on the lock member will substantially maintain the head at all times in its normal braking position, so that each brake head is practically rigid on the beam, except for its slight breathing movements before mentioned and which do not affect the efficiency of the brake when forced against the car wheels. It will be seen that by such a spring key or the like a shock absorber is in reality provided between each brake head and the brake beam.

More specifically described, for accomplishing the desired purposes the invention includes a support on each end of the brake beam, each support having substantially parallel upper and lower surfaces and substantially parallel front and rear surfaces, inasmuch as the support is of rectangular shape in a vertical plane transverse of the longitudinal axis of the beam.

The brake head comprises at least the face portion thereof and the rearwardly extending walls of the collar 12, which are parallel with the upper and lower surfaces of the support and which walls have a slide fit fore and aft upon said surfaces, the vertical axis of the brake head being at right angles to the central horizontal plane of the support.

The upper and lower rearward walls on the brake head protrude rearwardly of the support and have the upper and lower eyes or holes 18, which are on an axial line that is parallel with and extends behind the rear surface of the support.

The vertical groove or channel 16 in the rear surface of the support has its intermediate wall in line with the said eyes and is engaged by the outward curve of the bowed spring key 20, to permit it to tend to straighten out more or less when forces other than those which are due to brake operation are occasioned, the rearwardly diverging ends of the spring key strongly engaging the rear edges of the eyes and pressing the head rearwardly to normal braking position, so that the vertical flat surfaces of the head which define the back of the face portion thereof are set squarely against the front surface of the support.

It is important that the rear edges of the eyes 18 be so disposed in ample spaced relation from the intermediate wall of the groove 16 that if the bowed spring key is strained and flexed by forces acting to shift the brake head somewhat forwardly, when the strain is released and the head relieved of such forces the rearwardly diverging ends of the spring will exert the necessary rearward pressure and return the head to normal braking position.

Strictly speaking, the shock absorber is not intended to enable the brake head to breathe, as it were, in a rectilinear direction, for its specific object is to compensate for the lack of endwise movement of the brake beam, this being prevented by the usual hangers. Such compensation actually ensues under the present invention when forces other than braking forces are imposed on the brake head, in which case the brake head can breathe laterally to either side of itself, to the inside or outside, and cants more or less with respect to the normal vertical plane of the head transverse of the longitudinal axis of the brake beam.

The brake head has a forward opening 24 for receiving the lower cross bar of a swing hanger, and as the head serves as either a right or a left such opening preferably flares in opposite directions at 25, 26 toward both ends so as to accommodate the hangers at both ends of the brake beam.

It will be obvious to those skilled in the art that the illustrated and described invention is susceptible to modification without departing from the scope of the appended claims.

What I claim as new is:

1. The combination of a brake beam having a substantially rectangular brake head-receiving support at its end providing substantially parallel upper and lower surfaces and substantially parallel front and rear surfaces, a brake head having a face portion and walls behind the face portion and parallel with such upper and lower surfaces, and the inward surfaces of the walls and such upper and lower surfaces in mutual engagement, the head having an upright surface at the back of the face portion thereof and engaging with the front surface of the support, the rear ends of such brake head walls having vertically disposed upper and lower eyes, and the rear surface of the support grooved vertically in line with the eyes, and a forwardly pre-bowed spring key extending through the eyes with the out-curve of the bow pressing forwardly in the groove and against the intermediate wall thereof, the rearwardly diverging ends of the bow pressing rearwardly against the back edges of the eyes, said back edges spaced away from the rear surface of the support sufficient to accommodate the diverging ends, and the key constituting shock-absorbing means whereby the brake head's upright surface is normally forced against the front surface of the support to overcome a yielding forward movement and absorb shocks on the brake head independent of the braking forces.

2. A brake beam, brake heads having back portions, support members on the beam receiving the back portions of the heads, the heads through their back portions having a fore and aft slide fit on the support members parallel with the beam, and pre-bowed spring keys between the back portions of the brake heads and the back surfaces of the support members, rearwardly diverging ends of the keys pressing on the back portions of the heads in a direction rearwardly of the beam and the intermediate portions having out-curves pressing on the back surfaces of the support members in a forward direction, whereby to absorb shocks on the brake heads which are independent of the braking forces.

3. In combination, a truss brake beam, rectangular support members forming locks uniting the compression and tension members of the truss, tensioning nuts screwed onto the tension member, a brake head on each end of the beam and against which one of the nuts is seated, each brake head having a rectangular collar with an opening of larger dimension transversely of the head than the corresponding dimension of the support member and providing a space behind each support member, each head slidable in the plane of the truss fore and aft on its support and said collar adapted to pass by the adjusting nut on the end of the brake beam and onto the support member, and shock-absorbing means located in the said space and acting between the collars and the supports to maintain the brake heads in braking position independently of the braking forces.

4. The combination according to claim 3, in which each shock-absorbing means resides in a pre-bowed spring key having a length sufficient to extend downwardly through the collar and into such space, and to press rearwardly against the collar at its upper and lower ends.

5. In combination, a brake beam, support members on the ends of the beam, and brake heads each having a collar with its opening extending transversely of the head, the collar being of rectangular shape and each support member of rectangular shape around the end of the beam, the mutually facing upper and lower surfaces and the forward surfaces respectively of the collar and the support member bearing one on the other, such upper and lower surfaces of the collar having a fore and aft slide fit on said upper and lower surfaces of the support member, and the mutually facing surfaces of the collar and support member spaced apart at the rear, and opposed portions of such rear surfaces channeled and providing a throat of greater dimension than the spaced distance between the other portions of the rear surfaces, together with spring shock-absorbing means located in the throat and bearing rearwardly on the collar and forwardly on the support member with the tendency to maintain such forward surfaces of the collar and support member squarely together.

CHARLES R. BUSCH.

REFERENCES CITED

The following references are of record in the file of this patent:

UNITED STATES PATENTS

| Number | Name | Date |
|---|---|---|
| 1,076,956 | Crone | Oct. 28, 1913 |
| 1,282,860 | Knapp | Oct. 29, 1918 |
| 1,315,399 | Peycke | Sept. 9, 1919 |
| 1,886,734 | Prentice | Nov. 8, 1932 |
| 2,107,521 | Busch | Feb. 8, 1938 |
| 2,398,918 | Busch | Apr. 23, 1946 |
| 2,412,388 | Busch | Dec. 10, 1946 |